United States Patent [19]

Ohe et al.

[11] Patent Number: 4,898,258
[45] Date of Patent: Feb. 6, 1990

[54] ELECTRIC POWER STEERING APPARATUS

[75] Inventors: Takeshi Ohe; Yoshiaki Taniguchi; Hiroshi Nishikiori, all of Saitama, Japan

[73] Assignee: Jidosha Kiki Co., Ltd., Tokyo, Japan

[21] Appl. No.: 314,180

[22] Filed: Feb. 22, 1989

[30] Foreign Application Priority Data

Feb. 29, 1988 [JP] Japan ................... 63-47110

[51] Int. Cl.$^4$ ............................................. B62D 5/04
[52] U.S. Cl. .................................... 180/79.1; 180/142
[58] Field of Search ................... 180/79.1, 142, 148

[56] References Cited

U.S. PATENT DOCUMENTS 4,448,275 5/1984 Kitagawa et al. ................. 180/79.1
4,621,701 11/1986 Takabayashi et al. ............. 180/79.1
4,681,182 7/1987 Suzuki et al. ..................... 180/79.1

FOREIGN PATENT DOCUMENTS

61-226362 10/1986 Japan .

Primary Examiner—Charles A. Marmor
Assistant Examiner—Donn McGiehan
Attorney, Agent, or Firm—Blakely, Sokoloff, Taylor & Zafman

[57] ABSTRACT

An electric power steering apparatus includes a torsion bar, input and output shafts, an electric motor, and a detecting mechanism. The input and output shafts are coupled to each other by the torsion bar so as to be pivotally displaced in relation to each other. The electric motor is coupled to the output shaft so as to apply an auxiliary steering force. The detecting mechanism detects a relative, pivotal displacement of the input and output shafts. Main portions of the input and output shafts are coaxially arranged. One of the shafts is a cylindrical member having an outer end in which the torsion bar is housed. An inner end of one shaft is pivotally inserted in an opening of a cylindrical inner end of the other shaft. The detecting mechanism is arranged on the outer surface of an outer shaft of the input and output shafts at their overlap portion. A displacement transmitting portion for transmitting a displacement of one shaft to the detecting mechanism is formed in the inner end of one shaft so as to extend through the other shaft. The detecting mechanism can obtain a relative, pivotal displacement of the input and output shafts from a displacement of one shaft transmitted from the displacement transmitting portion.

11 Claims, 5 Drawing Sheets

ELECTRIC POWER STEERING APPARATUS

BACKGROUND OF THE INVENTION

The present invention relates to a power steering apparatus for reducing an operating force (steering force) of a steering wheel and, more particularly, to an improvement in an electric power steering apparatus comprising an electric motor as an auxiliary steering force generating means.

A hydraulic power steering apparatus has been mainly employed as a conventional power steering apparatus. However, various types of electric power steering system using an electric motor or the like have recently been proposed in, e.g., Japanese Patent Laid-Open No. 61-226362. More specifically, a hydraulic power steering apparatus requires a large number of components, such as a hydraulic cylinder for generating an auxiliary steering force, a hydraulic pump, a flow path selection valve, and a hydraulic pipe system for connecting these components. In addition, the arrangement of each component is complex, and hence high process precision and the like are required. Therefore, the manufacture and assembly of the apparatus are cumbersome, and moreover, the size and weight of the overall apparatus are increased, thus posing problems, such as an increase in cost. For this reason, a great deal of attention has been paid to an electric power steering apparatus comprising an electric motor, as an auxiliary steering force generating means, which can be used by connecting it to a built-in battery, a controller, and the like by using simple electric wiring. Since the arrangement of an apparatus of this type can be simplified as compared with the above-described hydraulic power steering apparatus, a small, compact power steering apparatus can be realized.

Employment of an electric motor as an auxiliary steering power generating means in a power steering apparatus, however, poses various problems in terms of the assembly structure of the motor with respect to a steering system, the arrangement and performance of each component for operation control of the motor, and the like. For this reason, practical use of such a type of apparatus has not been realized.

One of the problems in the electric power steering apparatus is associated with the coupling structure of an input shaft on the steering wheel side, which constitutes a steering shaft as a main shaft, with an output shaft on the wheel side. Generally, the input and output shafts constituting the steering shaft are coupled through a torsion bar to each other so as to be pivotally displaced from each other because a steering angle, a steering force, and the like upon steering operation must be detected. In addition, a detecting mechanism capable of detecting a relative pivotal displacement due to torsion of the torsion bar between the shafts is arranged at the coupling portion, so that drive control of the motor for applying an auxiliary steering force to a portion of the output shaft system can be performed by using a signal from the detecting mechanism. The simplest arrangement is that the input and output shafts are arranged so as to cause their end portions to oppose each other, and a relative displacement between rotary detecting members mounted on the shafts is detected. In such an arrangement, the size of the apparatus in the axial direction is increased, and hence the size of the overall apparatus is inevitably increased.

On the other hand, an electric power steering apparatus of this type is required to have a simple overall arrangement allowing easy manufacture, assembly, and the like, and a decrease in size and weight of the overall apparatus. In addition, a demand has arisen for a compact, low-cost apparatus which is excellent in performance and mountability. Such a demand has become strong because an apparatus of this type is employed even in small cars and the like in which the problem of space is serious.

In addition, such an electric power steering apparatus is required to be arranged such that a motor is properly driven/controlled by simply and properly detecting various vehicle travel conditions, such as a steering force, a steering angle, and a vehicle speed corresponding to steering wheel operation of a driver, thereby obtaining an auxiliary steering force as needed. More specifically, during a stationary turn in a vehicle stop state, or during steering at a low vehicle speed, a very small steering force is required. However, during high-speed travel, proper rigidity, i.e., a sense of heaviness is required. In order to satisfy such a requirement, such an apparatus must be driven/controlled in accordance with a vehicle speed, a steering force, and a steering angle. Therefore, a detecting mechanism for such an operation must be arranged with high precision.

Various conventional arrangements are known as such a detecting mechanism. However, each of them has problems in terms of structure and performance. This is conspicuous in, e.g., a steering force detecting mechanism for detecting a steering request from a driver with respect to a steering wheel. Thus, various problems are posed especially in terms of a detecting method, a portion to be detected, and an arrangement position and detection performance of the detecting mechanism. As the above-described steering force detecting mechanism, a mechanism constituted by a non-contact type torque sensor, a signal processing circuit, and the like may be incorporated in a steering gear body while being interposed between input and output shafts constituting a steering shaft. This detecting mechanism requires a large number of components, and moreover, it must be mounted on the output shaft or the body side in a pivotal or stationary state. Therefore, assembly and the like become cumbersome and complicated. In addition, since mounting precision among components greatly influences the detecting precision of the sensor described above, relative positioning of these components is cumbersome, thus posing problems in terms of workability and operation reliability. Therefore, a strong demand has arisen for a countermeasure against these problems.

SUMMARY OF THE INVENTION

It is, therefore, a principal object to provide an electric power steering apparatus which is reduced in size and weight to be compact, and hence can be manufactured at a low cost.

It is another object of the present invention to provide an electric power steering apparatus which can be easily manufactured and assembled.

In order to achieve these objects, according to the present invention, there is provided an electric power steering apparatus comprising a torsion bar, an input shaft on a steering wheel side and an output shaft on a wheel side, the input and output shafts being coupled to each other by the torsion bar so as to be pivotally displaced in relation to each other, an electric motor, coupled to the output shaft, for applying an auxiliary steering force thereto, and detecting means for detecting a relative, pivotal displacement of the input and output shafts, wherein main portions of the input and output shafts are coaxially arranged, one of the shafts is a cylindrical member having an outer end in which the torsion bar is housed, an inner end of the one shaft is pivotally inserted in an opening of a cylindrical inner end of the other shaft the detecting means is arranged on an outer surface of an outer shaft of the input and output shafts at an overlap portion thereof, displacement transmitting means for transmitting a displacement of the one shaft to the detecting means is formed in the inner end of the one shaft so as to extend through the other shaft, and the detecting means can obtain a relative, pivotal displacement of the input and output shafts from a displacement of the one shaft transmitted from the displacement transmitting means.

According to the present invention, when input and output shafts are coupled to each other through a torsion bar, their inner and outer surfaces are overlapped, and a detecting mechanism is arranged on the outer surface of the outer shaft. In addition, since the detecting mechanism is coupled to a coupling pin or the like serving as an inner shaft displacement extracting means through a communicating hole formed in the outer shaft from the inner shaft side so as to oppose the outer shaft, the input and output shafts can be reduced in size especially in the axial direction. Moreover, according to the present invention, the arrangement of a detecting mechanism is simplified by arranging a noncontact type sensor and output signal wiring means on upper and lower surfaces of a printed circuit board, and stable signal extraction can be performed by properly bringing forked elements of a brush serving as the output signal wiring means into contact with the slip ring in its both rotating directions.

DETAILED DESCRIPTION OF THE PREFERRED EMBODIMENT

An embodiment of the present invention will be described below with reference to the accompanying drawings.

Figure 4A:
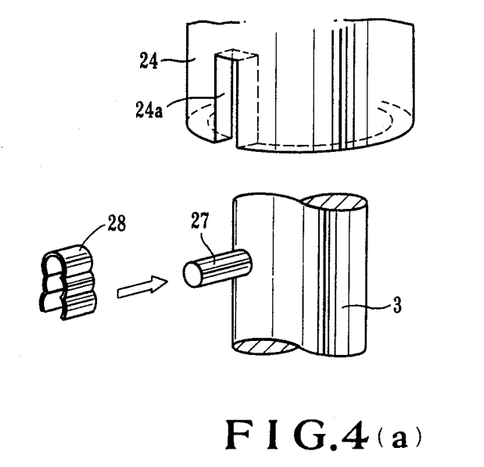
Figures 4B, 4C:
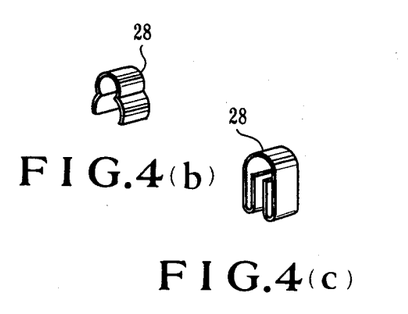
Figure 5:
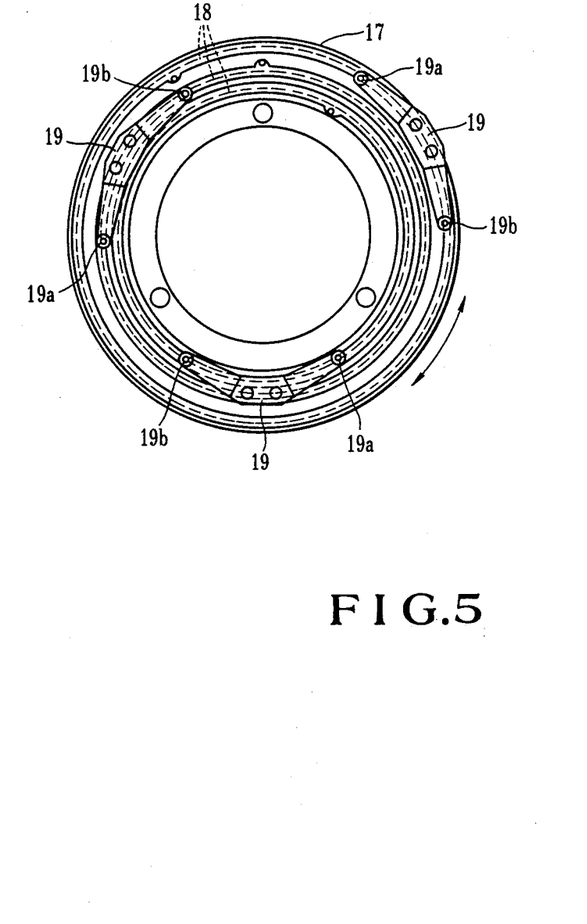
FIG. 5 is a schematic view showing an arrangement of an output signal extracting means.
Figure 6:
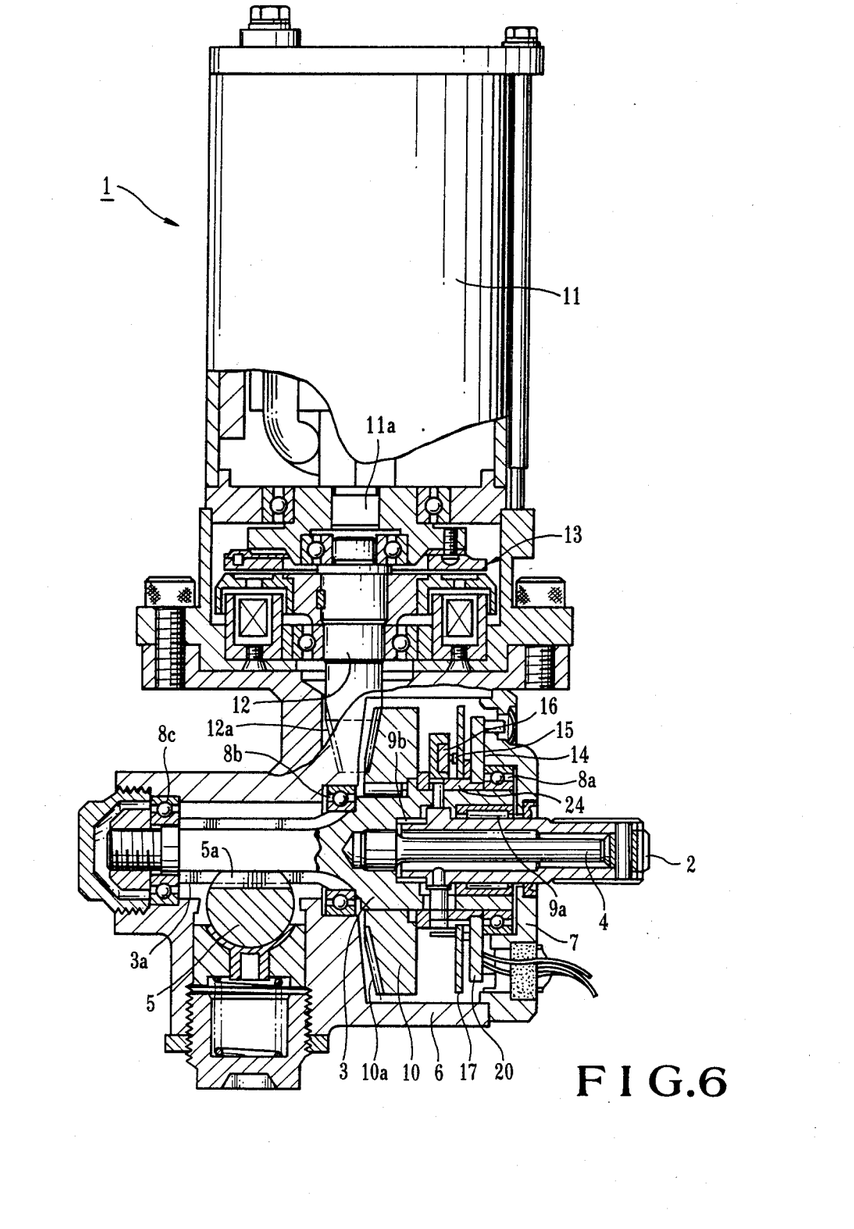
FIG. 6 is a schematic sectional view showing an electric power steering apparatus to which the present invention is suitably arranged.

FIGS. 1 to 6 show an electric power steering apparatus according to the embodiment of the present invention. A schematic arrangement of the electric power steering apparatus denoted by reference numeral 1 will be described below with reference to FIG. 6 and the like. Reference numeral 2 denotes a stub shaft serving as an input shaft to be coupled to the steering wheel side; 3, a pinion shaft having a pinion 3a coupled to the wheel side (not shown) and serving as an output shaft; and 4, a torsion bar for coupling the shafts 2 and 3 so as to be pivotally displaced with respect to each other within a predetermined range of angle. The above-described members constitute a steering shaft. One end of the torsion bar 4 is fixed to the inner end of the cylindrical stub shaft 2 by a fixing member, such as a pin, and the other end of the torsion bar 4 is inserted in a hole formed in one end of the pinion shaft 3. In addition, the shafts 2 and 3 constituting the steering shaft extend into steering gear bodies 6 and 7 together with a rack having a rack tooth 5a to be meshed with the pinion 3a, as shown in FIG. 6. Note that reference numerals 8a, 8b, 8c, 9a, and 9b denote bearings for rotatably supporting the shafts 3 and 2 in the bodies 6 and 7. In this case, a simple cylindrical metal bush is exemplified as the bearing 9b. The rack 5 constitutes a steering link mechanism for linking wheels together with a pitman arm, a tie rod and the like (not shown).

In the above-described steering shaft mechanism portion, a large gear 10 constituted by a hypoid gear having a side portion on the rack 5 side as a tooth surface 10a is arranged on the pinion shaft 3 on the wheel side coupled to the stub shaft 2 on the steering wheel side through the torsion bar 4. In addition, an electric motor 11 for applying an auxiliary steering force to the pinion shaft 3 side through the large gear 10 is arranged to be substantially perpendicular to the pinion shaft 3. A small gear 12 constituting a reduction gear mechanism together with the large gear 10 is arranged on the distal end side of a motor shaft 11a of the motor 11. With this arrangement, an auxiliary steering force from the motor 11 is transmitted to the pinion shaft 3 side. According to such an arrangement, the motor 11 and the like are efficiently coupled to the steering gear bodies 6 and 7 comprising the steering shaft (2, 3, 4) and the like, and the pinion shaft 3 through the reduction gear mechanism constituted by the hypoid gear. As a result, the overall apparatus can be reduced in size and weight, and hence a compact apparatus can be realized. Especially, the size of the apparatus can be reduced by a portion corresponding to an overlap portion of the shafts, thus providing great advantages. In addition, a rotating force from the motor 11 is transmitted to the large gear 10 arranged between the stub shaft 2 having the highest rigidity on the pinion shaft 3 and the steering gears 3a and 5a, and is also transmitted to the steering gear side along a steering torque transmission path through which the driver's steering torque is transmitted from the stub shaft 2 to the rack 5. Therefore, transmission of the driving force can be properly and reliably performed, and durability of each component is good.

The embodiment exemplifies a case wherein an electromagnetic clutch 13 for selectively connecting and disconnecting a rotating force from the motor 11 is arranged between the output end of the motor shaft 11a and the small gear 12 having a tooth portion 12a to be meshed with the tooth portion 10a of the large gear 10 on the pinion shaft 3 side. According to this arrangement, an auxiliary steering force from the motor 11 can be transmitted to the pinion shaft 3 side only when it is required, thereby providing functions, e.g., of preventing degradation in steering characteristics due to the inertia of the motor 11. However, the electromagnetic clutch 13 may be omitted.

Figure 1:
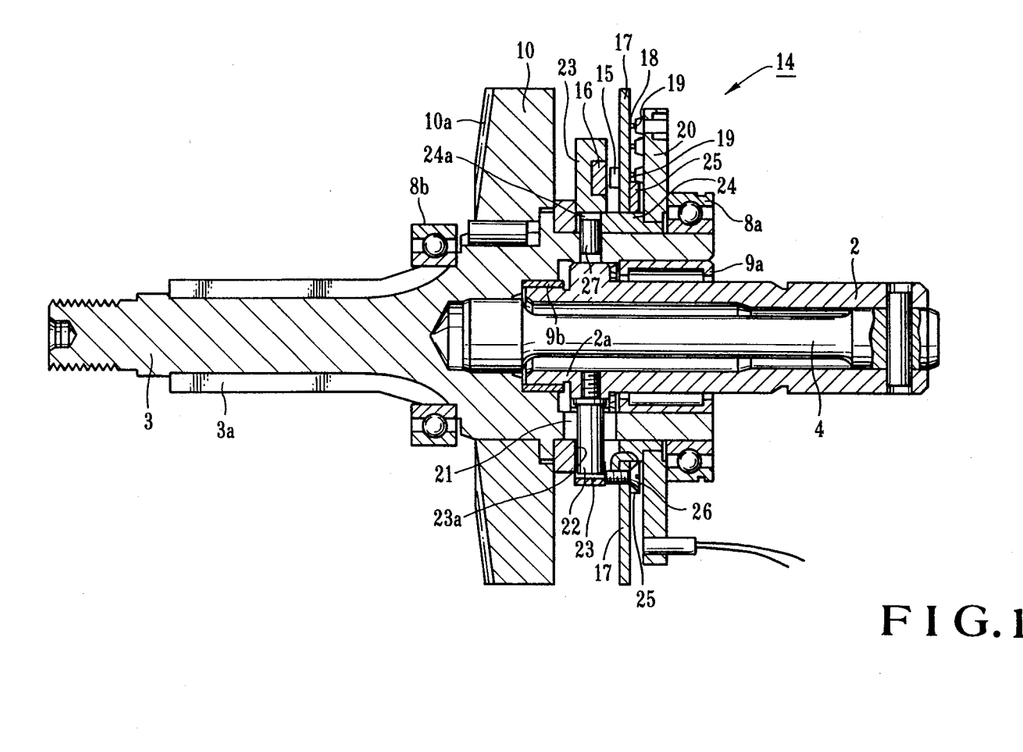
FIG. 1 is an enlarged sectional view showing a main part of an electric power steering apparatus according to an embodiment of the present invention.
Figure 2:
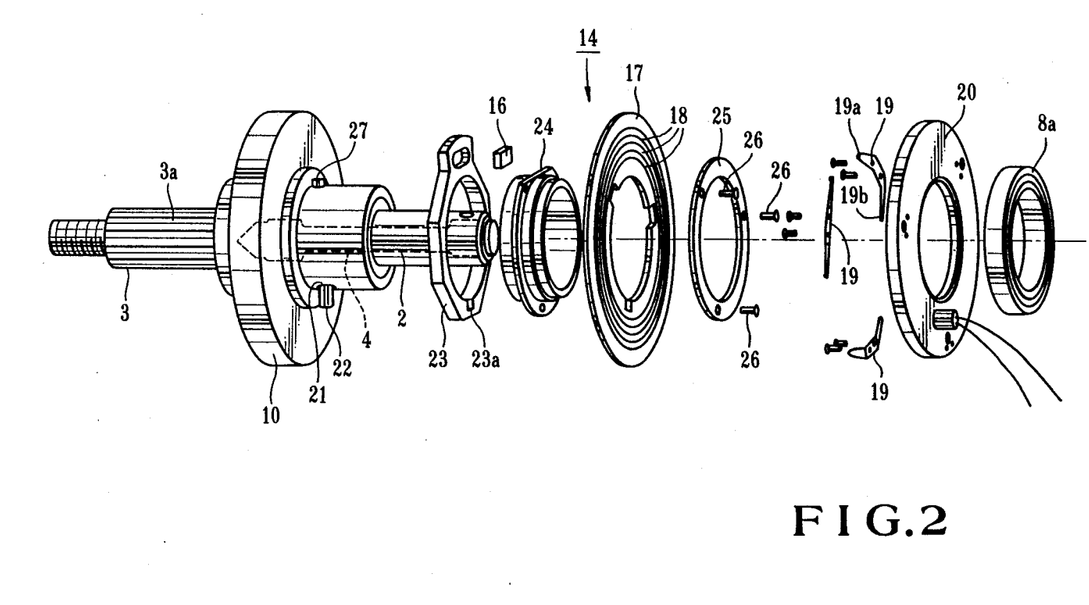
FIG. 2 is a schematic exploded perspective view showing an arrangement of the main part.
Figure 3A:
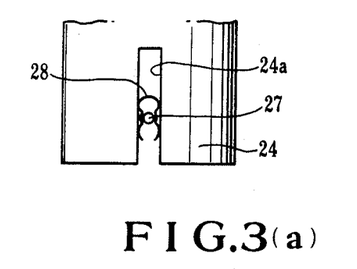
FIGS. 3(a), 3(b), and 3(c), and FIGS. 4(a), 4(b), and 4(c) are schematic views for explaining coupling structures of the shaft side and the detecting mechanism side for engaging/fixing a coupling pin, respectively.
Figure 3B:
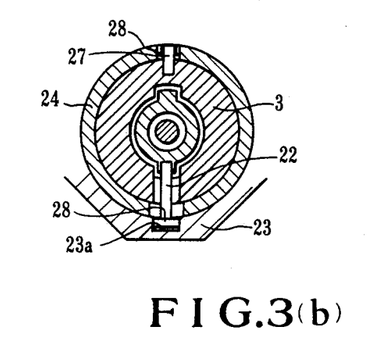
Figure 3C:
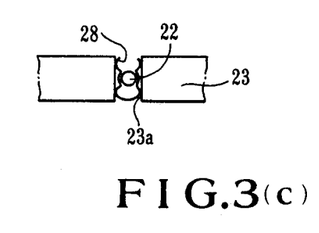

As is apparent also from FIGS. 1 and 2, a detecting mechanism 14 for detecting a relative, pivotal displacement of the stub and pinion shafts 2 and 3 due to torsion of the torsion bar 4 comprises a Hall element 15 arranged on the pinion shaft 3 and serving as a noncontact type torque sensor, a magnet 16 arranged on the stub shaft 2 side so as to oppose the Hall element 15, a printed circuit board 17 having the Hall element 15 mounted thereon and a sensor signal processing circuit as a detecting circuit, and the like. Detection signals from the detecting mechanism 14 are sent out from leads extending outwards from the bodies 6 and 7 through an output signal extracting slip ring 18 integrally formed with the substrate 17, and a brush holder 20 having a brush (slider) 19 brought into slidable contact with the slip ring 18 and serving as a signal extracting portion. The brush holder 20 is fixed to the body 7 or another proper fixing portion. Therefore, it is pivotally attached to a board holder (to be described later).

According to a characteristic feature of the present invention, in the above-described arrangement, the stub shaft 2 on the steering wheel side is coupled to the pinion shaft 3 on the wheel side through the torsion bar 4 so as to be pivotally displaced in relation to each other as follows. An inner end 2a of the stub shaft 2 is pivotally fitted in an opening of the pinion shaft 3. Portions of the shafts 2 and 3 are overlapped to be combined, and the detecting mechanism 14 is arranged on the outer surface of the pinion shaft 3 at the overlap portion. In addition, the stub shaft 2 and an input side member (a magnet ring holder 23 having the magnet 16 in this embodiment) of the detecting mechanism 14 are coupled to each other by using a coupling pin 22 serving as an input side displacement extracting means which is formed on the stub shaft inner end 2a so as to extend through a communicating hole 21. The communicating hole 21 is formed in the pinion shaft 3 in the form of an elongated groove extending by a length exceeding at least the relative, pivotal range of the shafts 2 and 3 in the rotating direction so as to oppose the inner end 2a.

That is, according to the present invention, in order to solve the conventional problem that the axial size tends to be increased because of the detecting mechanism 14 which is required to be arranged to detect a relative, pivotal displacement between the shafts 2 and 3, the input and output shafts 2 and 3 are coupled to each other through the torsion bar 4 in such a manner that the inner and outer portions of the shafts 2 and 3 are overlapped to be combined so as to minimize a coupling length required for the torsion bar 4, thus reducing the axial size. In addition, extraction of a displacement on the stub shaft side 2, which poses a problem when such an arrangement is employed, is easily and properly performed at a portion on the large gear 10 side which has a larger space than the displacement extracting portion of the pinion shaft 3 in the following manner. The coupling pin 22 is formed upright on the stub shaft 2 so as to extend through the communicating hole 21 formed in the pinion shaft 3 at the corresponding portion and having at least a size allowing a relative, pivotal displacement of the shafts 2 and 3, thus coupling the stub shaft 2 to the detecting mechanism 14. With this arrangement, the shafts 2 and 3, and the detecting mechanism 14 can be properly and efficiently arranged, and moreover, the size of the overall apparatus can be reduced to realize a compact apparatus. Note that reference symbol 23a denotes an engaging groove formed in the magnet ring holder 23, in which the coupling pin 22 is engaged.

Referring to FIGS. 1 and 2, reference numeral 24 denotes a board holder, fitted on the overlap portion of the pinion and stub shafts 3 and 2, for holding the printed circuit board 17 by clamping it between a stop ring 25 and itself. These components are integrally assembled by screws 26. In this embodiment, a coupling pin 27 formed upright on the pinion shaft 3 is engaged in an engaging groove 24a, so that the board holder 24 is integrally rotated. The magnet ring holder 23 is pivotally supported on a cylindrical portion of the board holder 24. In this case, a notched portion or the like is formed in the magnet ring holder 23 so as to allow movement of the coupling pin 22.

Some problems are posed at the coupling member for coupling the inner end 2a of the stub shaft 2 to the magnet ring holder 23 serving as the input side member of the detecting mechanism 14, and the coupling portion for coupling the pinion shaft 3 to the ring-like board holder 24 serving as the output side member of the detecting mechanism 14. More specifically, in the detecting mechanism 14, the magnet 16 on the magnet ring holder 23 and the Hall element 15 arranged on the printed circuit board 17 are required to be assembled with high positioning precision. For this reason, strict process precision is required between the coupling pin 22 on the stub shaft 2 side and the engaging groove 23a, between the coupling pin 27 on the pinion shaft 3 side and the engaging groove 24a of the board holder 24, and the like. In addition, such high precision is required in a combined state of the stub shaft 2 and the pinion shaft 3. In practice, however, it is difficult to process and assemble these members with high precision. A slight positional error and the like cannot be avoided. According to the present invention, in consideration of these points, clearances are provided between the coupling pins 22 and 27 and the engaging grooves 23a and 24a. In addition, as shown in FIGS. 3(a), 3(b), and 3(c), and 4(a), a spring member 28 prepared by bending a leaf spring or the like is used. The spring members 28 are inserted between the coupling pins 22 and 27 and the engaging grooves 23a and 24a upon adjustment, so that the coupling pins and the engaging grooves are engaged/fixed with/to each other by utilizing preset forces of the spring members 28. With this arrangement, engaging positions of the coupling pins 22 and 27 and the engaging grooves 23a and 24a can be adjusted, and hence precision requirement of each component and the like can be rendered less strict. In addition, the shafts 2 and 3 can be coupled to each other while the Hall element 15 and the magnet 16 are properly positioned. This also provides great advantages. Note that various modifications of the spring members 28 can be made, as shown in FIGS. 4(b) and 4(c). In addition, the spring members 28 may be attached to the coupling pins 22 and 27 and assembled in the engaging grooves 23a and 24a. Alternatively, they may be attached to the engaging grooves 23a and 24a. Note that the Hall element 15 may comprise two elements arranged in parallel while one element serves as a compensating element. This equally applies to the magnet 16.

As is apparent from FIGS. 1 and 2, according to the present invention, the Hall element 15 as a noncontact type sensor for detecting a pivotal displacement between the input and output shafts 2 and 3 is arranged on one side of the printed circuit board 17 constituting the detecting mechanism 14 while the slip ring 18 as an output signal wiring means is integrally formed on the other side of board 17, so that the number of components of the detecting mechanism 14 can be minimized. Hence, the arrangement is simplified to improve assembly efficiency, and the size of this portion can be reduced to realize a compact detecting mechanism. A brush 19 may be arranged as an output signal wiring means for the board 17 in place of the slip ring 18, and may be arranged on the magnet 16 side as a noncontact type sensor.

Furthermore, according to the present invention, the brush 19 for extracting an electrical signal to the stationary portions (bodies 6 and 7) upon slidable contact with the slip ring 18 formed on the board 17 is formed so as to have forked contact elements 19a and 19b, as shown in FIGS. 2 and 5, so that the contact elements 19a and 19b are brought into contact with the spring ring 18 along the respective rotating directions. With such an arrangement, extraction of signals from the steering shafts (2, 3) to be rotated clockwise and counterclockwise can be performed by ensuring a proper contact state between one of the contact elements 19a and 19b and the slip ring 18.

According to such an arrangement, a steering torque can be easily and properly detected by the noncontact type torque sensor constituted by the Hall element 15 and the magnet 16 opposing it. In addition, this displacement detecting mechanism can be efficiently arranged on the steering shaft (2, 3) which is obtained by coupling the shafts such that their portions are overlapped, and hence the overall apparatus can be reduced in size. Note that return of the steering wheel after a steering operation can be performed by the motor 11 which is controlled by a pivotal displacement of the pinion shaft 3 on the output side, which is displaced by a self-aligning torque from the wheels, in relation to the stub shaft 2 on the input side. Furthermore, according to the embodiment, the displacement detector constituted by the Hall element 15, an amplifier for processing a detecting signal from the detector, the signal extracting portion constituted by the brush 19, and the like are incorporated and sealed in the steering gear bodies 6 and 7, so that the above-mentioned members are arranged in the sealed space and is shielded from the outside. Therefore, this arrangement has other advantages of, e.g., preventing contact failure due to dust.

In the above-described embodiment, the noncontact type sensor for detecting a displacement between the shafts 2 and 3 is constituted by the Hall element 15 and the magnet 16 which are arranged so as to oppose each other in the axial direction. However, they may be arranged so as to oppose each other in the circumferential direction. In addition, a gap sensor or the like may be used as the noncontact type sensor. In this case, this sensor is used to control the electric motor 11 through a known control means.

The present invention is not limited to the above-described structure of the embodiment. The shape, structure, and the like of the electric power steering apparatus 1 can be changed and modified as needed. In the embodiment, the stub shaft 2 on the input side is fitted in the pinion shaft 3 on the output side. However, the present invention is not limited to this arrangement. For example, the pinion shaft 3 may be fitted in the stub shaft 2. Furthermore, in the embodiment, an auxiliary steering force from the motor 11 is transmitted to the pinion shaft 3 side by using the hypoid gear. However, the present invention is not limited to this as long as the pinion shaft 3 is coupled to the motor 11 through a proper gear mechanism. In addition, the arrangement state of the motor 11 with respect to the steering shaft may be properly modified.

Moreover, in the embodiment, the rack pinion type steering gear is exemplified as a steering gear. However, the present invention is not limited to this, but may be applied to a ball screw type steering gear.

As has been described above, the electric power steering apparatus according to the present invention comprises an input shaft on the steering wheel side and an output shaft on the wheel side, and a detecting mechanism for detecting a relative, pivotal displacement of the shafts. The inner end of one shaft is fitted in an opening of the other shaft, and the detecting mechanism is arranged on the outer surface of the outer shaft at the overlap portion of the shafts. In addition, the inner shaft and the detecting mechanism are coupled to each other through an inner shaft displacement extracting means constituted by a coupling pin and the like which is formed on the inner end of the inner shaft so as to extend through a communicating hole which is formed in the outer shaft so as to correspond to the inner end of the inner shaft. In spite of this simple, low-cost arrangement, the overall apparatus can be reduced in size and weight, especially in size in the axial direction, and a compact apparatus can be realized, thereby obtaining a layout which is excellent in mountability. In addition, since the detecting mechanism constituted by a noncontact type torque sensor, such as a Hall element, is properly and efficiently arranged, the present invention has various advantages, e.g., high-precision detection of a steering force.

According to the present invention, a noncontact type sensor for detecting a pivotal displacement between the shafts is arranged on one surface of the printed circuit board constituting the detecting mechanism, and a slip ring and a brush serving as output signal wiring means are integrally formed on the other surface of the circuit board. In addition, forked contact elements of the brush are designed to be brought into contact with the slip ring at a connection portion of the output signal wiring means. Therefore, in spite of this simple arrangement, the arrangement of the detecting mechanism is simplified, and ease in assembly and operation reliability can be increased.

What is claimed is:
1. An electric power steering apparatus comprising:
a torsion bar;
an input shaft on a steering wheel side and an output shaft on a wheel side, said input and output shafts being coupled to each other by said torsion bar so as to be pivotally displaced in relation to each other;
an electric motor, coupled to said output shaft, for applying an auxiliary steering force thereto; and
detecting means for detecting a relative, pivotal displacement of said input and output shafts, wherein main portions of said input and output shafts are coaxially arranged, one of said shafts is a cylindrical member having an outer end in which said torsion bar is housed, an inner end of said one shaft is pivotally inserted in an opening of a cylindrical inner end of the other shaft,
said detecting means is arranged on an outer surface of an outer shaft of said input and output shafts at an overlap portion thereof,
displacement transmitting means for transmitting a displacement of said one shaft to said detecting means is formed in the inner end of said one shaft so as to extend through said other shaft, and said detecting means can obtain a relative, pivotal displacement of said input and output shafts from a displacement of said one shaft transmitted from said displacement transmitting means.

2. An apparatus according to claim 1, wherein said displacement transmitting means comprises a pin formed on the inner end of said one shaft to extend radially extending outward, and a communicating hole for allowing pivotal movement of said pin in a circumferential direction is formed in the cylindrical outer end of said other shaft.

3. An apparatus according to claim 2, wherein said displacement transmitting means comprises a ring holder arranged on an outer surface of the cylindrical inner end of said other shaft, said pin is engaged with said ring holder, and said detecting means is arranged between said other shaft and said ring holder.

4. An apparatus according to claim 3, wherein said detecting means comprises a noncontact type sensor, a ring-like board holder for holding a board on which one component of said detecting means is mounted is attached to said other shaft, and the other component of said detecting means is attached to said ring holder.

5. An apparatus according to claim 4, wherein said detecting means comprises a Hall element and a magnet which is arranged so as to oppose said Hall element and be separated therefrom.

6. An apparatus according to claim 3, further comprising a member having an engaging groove formed therein, said engaging groove being engaged with said pin with a clearance, said member being fixed to said other shaft, a spring member being arranged in said engaging groove, said pin being positioned in said engaging groove by utilizing a spring force of said spring member.

7. An apparatus according to claim 4, wherein said board comprises a printed circuit board for processing a signal from said sensor, a portion of said sensor is mounted on one surface of said circuit board, and output wiring means for transmitting an output to said electric motor is arranged on the other surface of said circuit board.

8. An apparatus according to claim 7, wherein said output wiring means comprises a plurality of brushes and slip rings which are respectively brought into slidable contact with said brushes.

9. An apparatus according to claim 8, wherein said slip rings are respectively arranged at positions different from that of said sensor on said circuit board, and said brushes are respectively attached to slip ring holders which are arranged so as to oppose said slip rings and to cause said brushes to slide on the corresponding slip rings.

10. An apparatus according to claim 9, wherein each of said brushes comprises a forked member, two forks of which are brought into contact with a corresponding one of said slip rings at two positions.

11. An apparatus according to claim 10, wherein each of said brushes is brought into contact with a corresponding one of said slip ring at two positions in a circumferential direction.

* * * * *